(12) United States Patent  (10) Patent No.: US 9,238,551 B2
Kalitta et al.  (45) Date of Patent: Jan. 19, 2016

(54) BALL TRANSFER UNIT FOR CARGO BAY

(71) Applicants: Conrad Kalitta, Ypsilanti, MI (US); Steven Brewer, Oscoda, MI (US)

(72) Inventors: Conrad Kalitta, Ypsilanti, MI (US); Steven Brewer, Oscoda, MI (US)

(73) Assignee: KALITTA AIR LLC, Ypsilanti, MI (US)

( * ) Notice: Subject to any disclaimer, the term of this patent is extended or adjusted under 35 U.S.C. 154(b) by 0 days.

(21) Appl. No.: 14/243,619

(22) Filed: Apr. 2, 2014

(65) Prior Publication Data

US 2014/0326574 A1   Nov. 6, 2014

Related U.S. Application Data

(60) Provisional application No. 61/807,532, filed on Apr. 2, 2013.

(51) Int. Cl.
*B65G 39/00* (2006.01)
*B65G 39/02* (2006.01)
*B65G 13/00* (2006.01)
*B65G 39/10* (2006.01)
*B65G 39/12* (2006.01)
*B64D 9/00* (2006.01)

(52) U.S. Cl.
CPC ............... *B65G 39/025* (2013.01); *B64D 9/00* (2013.01); *B65G 39/12* (2013.01); *B64D 2009/006* (2013.01)

(58) Field of Classification Search
None
See application file for complete search history.

(56) References Cited

U.S. PATENT DOCUMENTS

| | | | |
|---|---|---|---|
| 4,696,583 A | 9/1987 | Gorges | |
| 4,871,052 A | 10/1989 | Huber | |
| 5,033,601 A | 7/1991 | Huber | |
| 5,096,308 A | 3/1992 | Sundseth | |
| 5,219,058 A | 6/1993 | Sundseth | |
| 5,390,775 A | 2/1995 | Herrick et al. | |
| 5,516,211 A | 5/1996 | Barnes et al. | |
| 6,125,984 A | 10/2000 | Huber et al. | |
| 6,287,013 B1 * | 9/2001 | Loncar ..................... | B65D 1/16 384/510 |
| 6,340,085 B1 | 1/2002 | Huber et al. | |
| 6,516,934 B2 * | 2/2003 | Masciarelli, Jr. ...... | B65G 13/12 193/35 MD |
| 6,991,082 B2 | 1/2006 | Olson et al. | |
| 7,007,786 B2 * | 3/2006 | Huber ...................... | B64C 1/20 193/35 MD |
| 7,007,787 B2 | 3/2006 | Pallini et al. | |
| 7,472,867 B2 | 1/2009 | Huber et al. | |
| 7,556,462 B2 | 7/2009 | Huber | |
| 7,650,979 B2 | 1/2010 | Szarkowski et al. | |
| 8,387,919 B2 | 3/2013 | Huber et al. | |
| 2010/0065400 A1 | 3/2010 | Pruett et al. | |

* cited by examiner

*Primary Examiner* — Kavel Singh
(74) *Attorney, Agent, or Firm* — Young Basile Hanlon & MacFarlane P.C.

(57) ABSTRACT

A ball transfer unit for use in association with installed trays in vehicle cargo bays. Ball transfer unit is a modular unit that includes a larger main roller ball, a semi-spherical housing for holding the larger main roller ball, a plurality of smaller roller balls interposed between the housing and the main roller ball and a unitary cover affixed to the housing for securing the various ball elements in relation to the housing and cover. The large roller ball protrudes partially through the cover, and the cover is designed to discourage the ingress of water and contaminants from entering the housing.

21 Claims, 5 Drawing Sheets

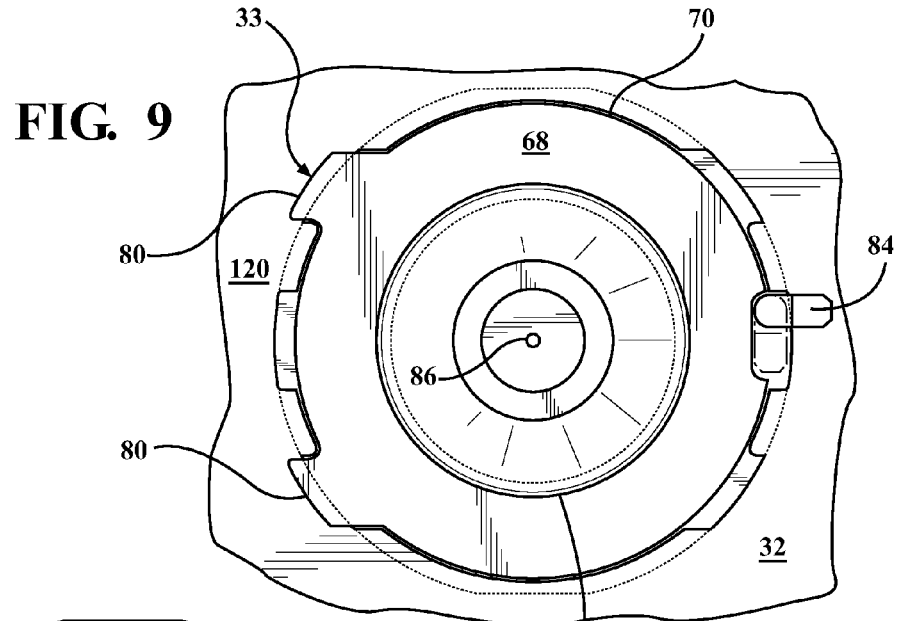
FIG. 9
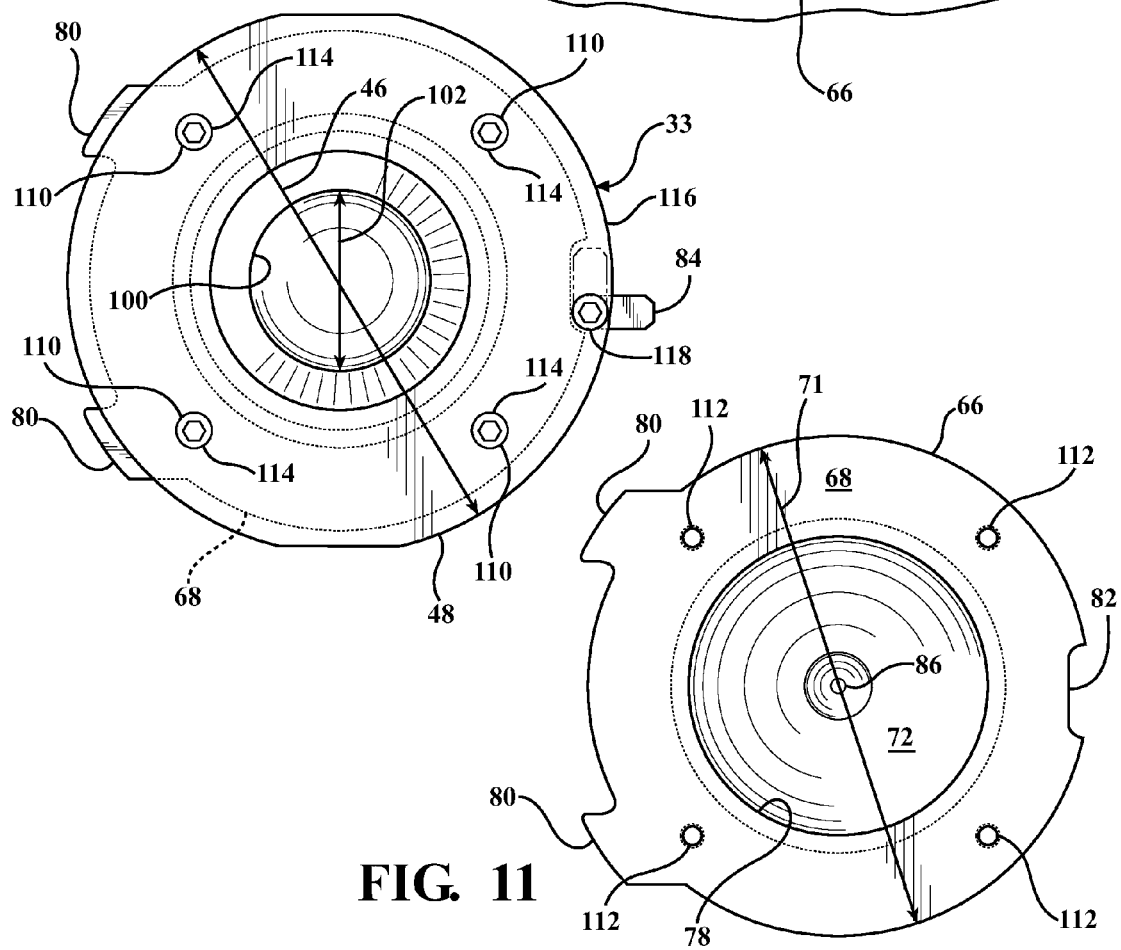
FIG. 10
FIG. 11

BALL TRANSFER UNIT FOR CARGO BAY

RELATED APPLICATIONS

This application claims benefit of U.S. Provisional Application No. 61/807,532 filed on Apr. 2, 2013, which is incorporated by reference herein in its entirety.

FIELD OF THE INVENTION

The invention relates to a ball transfer unit configured to be mounted on a floor of a cargo hold.

BACKGROUND OF THE INVENTION

Various systems for movably supporting cargo on the floor of cargo holds, such as those found in aircraft, sea-going cargo ships and other cargo-carrying vehicles, have been previously proposed. Typically, such systems include a plurality of roller ball elements mounted on the floor of the cargo hold, thereby providing a low friction support surface over which cargo may be moved. In a typical cargo hold, the floor, and sometimes the walls, are provided with a plurality of elongated trays that are permanently or semi-permanently attached to the floor or other interior surface of the cargo hold. Each tray accommodates one or more ball transfer units, which are removably secured to the trays, thereby permitting the ball transfer units to be replaced when worn or damaged.

While prior systems may have certain functional and useful features, many of the prior system suffer from common shortcomings. For example, it is not uncommon for cargo holds in vehicles to be subject to the periodic ingress of water, dirt or other contaminants. As a result, many prior designs are prone to contamination and may act as receptacles for unwanted water. As dirt, dust and other debris find their way into cargo holds, prior designs have a tendency to allow, or even facilitate, the entry of such contaminants into the ball transfer units. At some point, oxidation of the internal components of ball transfer units may occur, and the collection and concentration of debris in the interior of the units may significantly increase the internal friction occurring within the units, which may render them inefficient and make it difficult for cargo to be easily moved over the ball transfer assemblies. In addition, many prior devices have seams on their upper surfaces that may provide opportunities for cargo to get caught and immobilized during the loading and unloading processes of the cargo bay.

Additionally, currently known products are typically manufactured from metal castings. The loads imposed on ball transfer units by movement of cargo over such units are substantial, sometimes concentrating hundreds of pounds per square inch of load to an individual ball transfer unit. It is not uncommon for cast units to fracture under these loads, rendering the damaged ball transfer unit useless.

There is a need, therefore, for an improved ball transfer unit which restricts the ingress of water, contaminating fluids, dirt, dust and other debris, which present a smooth and unobstructed surface to minimize unintentional interference between the ball transfer unit and cargo being moved there over, and for a ball transfer unit design being constructed from machined versus cast materials to enhance the overall strength of the unit, thereby increasing its durability and useful life.

SUMMARY OF THE INVENTION

According to the present invention, there is provided a ball transfer unit for use in association with installed trays in vehicle cargo bays. The ball transfer units are modular units that comprise a large or main roller ball element, a semi-spherical housing for holding that element, a plurality of smaller ball elements interposed between the housing and the main ball element and a unitary cover affixed to the housing for securing the various ball elements in relation to the housing and cover, whereby the large ball element protrudes partially through said cover and where the cover is designed to discourage the ingress of water and contaminants into the housing.

The cover is manufactured without seams, and includes a transitional elevated portion of sufficient height to prevent most ingress of water or contaminants. The housing and cover may be machined, rather than cast, from high strength steel stock, such as, for example, stainless steel, which imparts substantial strength to the unit, reduces deterioration resulting from elemental exposure and provides the necessary strength to support a significant distributed and undistributed loads.

The preferred embodiments of the invention will be described by way of example with reference to the accompanying drawings herein.

BRIEF DESCRIPTION OF THE DRAWINGS

The various features, advantages and other uses of the present apparatus will become more apparent by referring to the following detailed description and drawings in which:

FIG. 9 is a bottom view of the ball transfer unit mounted to the roller tray;

FIG. 10 is a top plan view of the ball transfer unit; and

FIG. 11 is a top plan view of a bearing housing of the ball transfer unit.

DETAILED DESCRIPTION OF THE EMBODIMENTS

Figure 1:
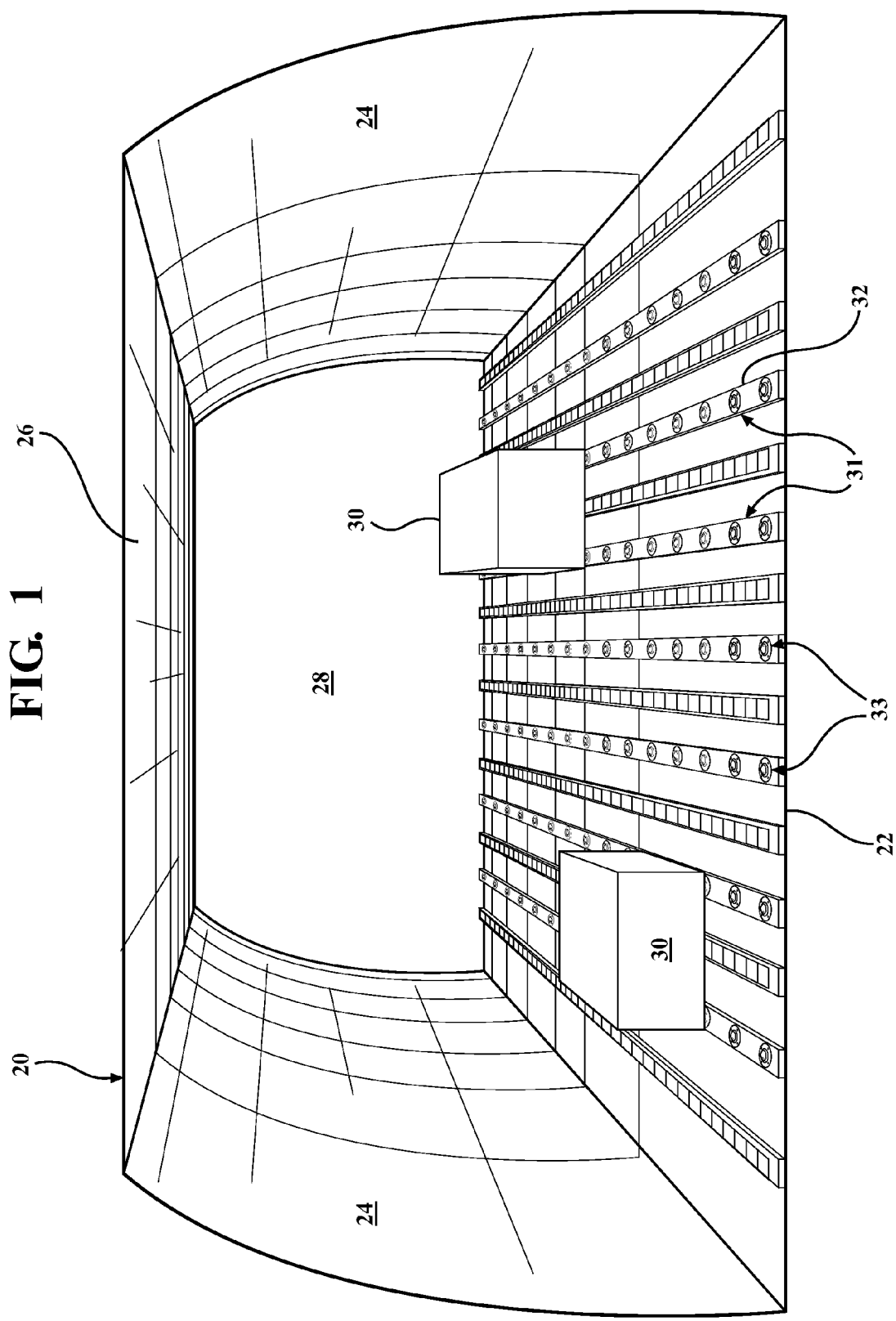
FIG. 1 is a schematic illustration of a typical cargo hold employing an exemplary roller unit.
Figure 2:
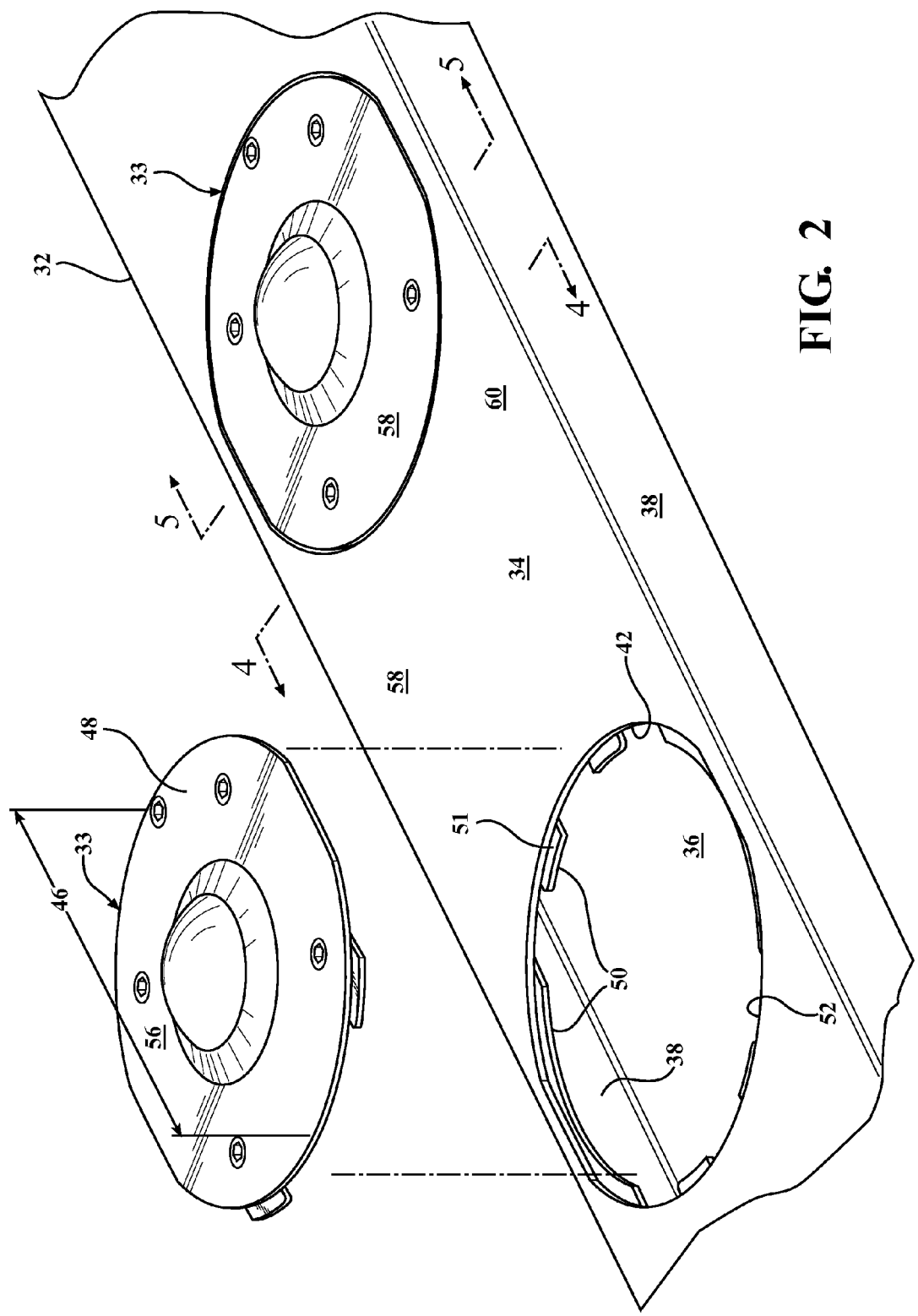
FIG. 2 is a perspective view of the roller unit of FIG. 1 including an exemplary ball transfer unit attached to a roller tray and a second ball transfer unit shown removed from the roller tray.
Figure 3:
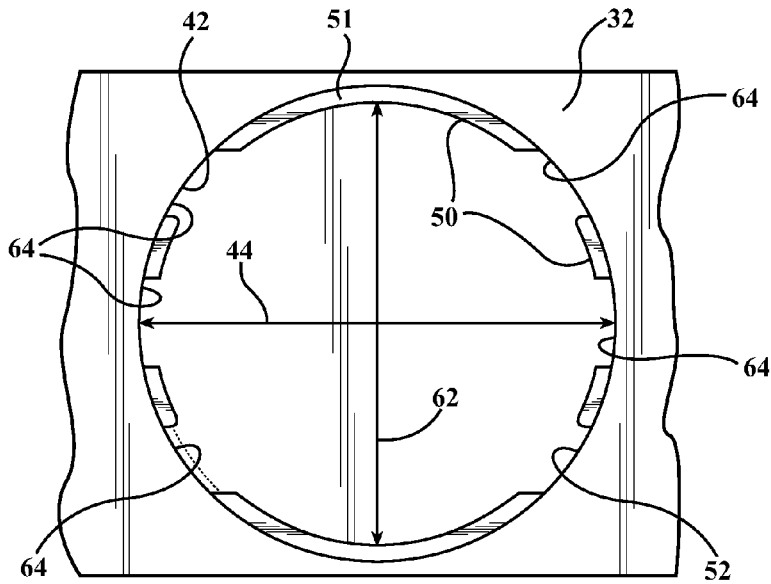
FIG. 3 is top plan view of the roller tray with the ball transfer unit removed.
Figure 4:
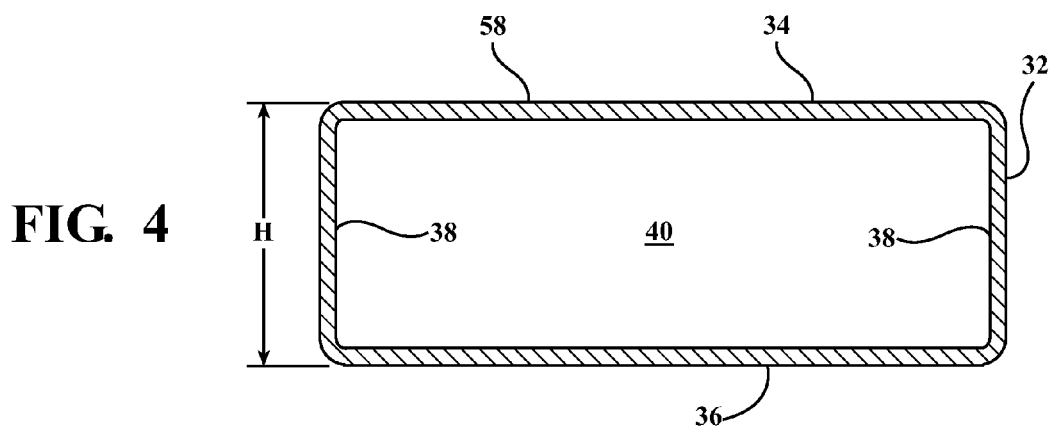
FIG. 4 is cross-sectional view of the roller tray taken along section line 4-4 of FIG. 2.

A typical cargo hold 20, such as may be found, for example, in an aircraft, is illustrated in FIG. 1. The cargo hold 20 may include a cargo hold floor 22, opposing cargo hold walls 24 and a cargo hold ceiling 26, which serve to define a generally confined compartment 28 in which a wide range of cargo 30 may be positioned, secured and transported. Attached to the cargo hold floor 22 are multiple elongated roller unit 31 that include a roller tray 32 configured to support a ball transfer unit 33. The roller unit 31 may also be mounted to the cargo hold walls 24. The number of roller units 31 disposed within the cargo hold 20 may depend, at least in part, upon the size of the cargo hold 20 and the configuration and weight of the cargo 30 to be distributed along the roller unit 31. The roller unit 31 may be permanently or semi-permanently mounted to the cargo hold floor 22.

With reference to FIGS. 2-5, the roller tray 32 may be generally configured in the shape of a rectangular tube. In one exemplary configuration, the roller tray 32 may have an overall height "H" of approximately two to three inches. Each roller tray 32 may include a top wall 34, a bottom wall 36 and opposing side walls 38, surrounding an approximately rectangular roller tray cavity 40. The top wall 34 of each roller tray 32 is provided with a plurality of tray openings 42 configured to receive the ball transfer unit 33. Each tray opening 42 has a diameter 44 which generally corresponds to an outer diameter 46 of a retainer cover 48 of the ball transfer unit 33. The outer diameter 46 of the retainer cover 48 may be sized slightly smaller than the diameter 44 of the tray opening 42 to enable the ball transfer unit 33 to be positioned within the tray opening 42.

Each tray opening 42 may include a lip 50 for supporting the ball transfer unit 33 within the tray opening 42. The lip 50 extends generally inward from a circumferential edge 52 of the tray opening 42. The retainer cover 48 of the ball transfer unit 33 engages a top surface 51 of the lip 50 when the ball transfer unit 33 is positioned within the tray opening 42. The outer diameter 46 of the retainer cover 48 may be sized larger than an inner diameter 62 as measured between diametrically opposed points on lip 50 (see for example FIG. 3). This enables the retainer cover 48 of the ball transfer unit 33 to rest on the lip 50.

Figure 5:
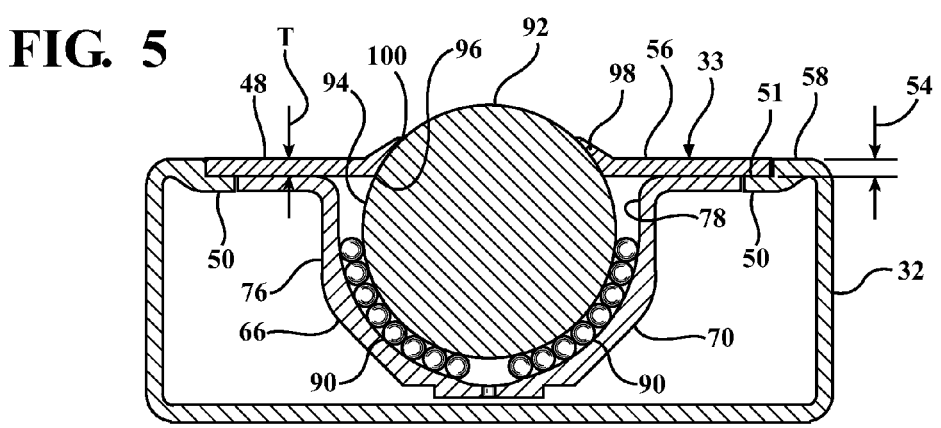
FIG. 5 is partial cross-sectional view of the roller unit taken along section line 5-5 of FIG. 2.
Figure 6:
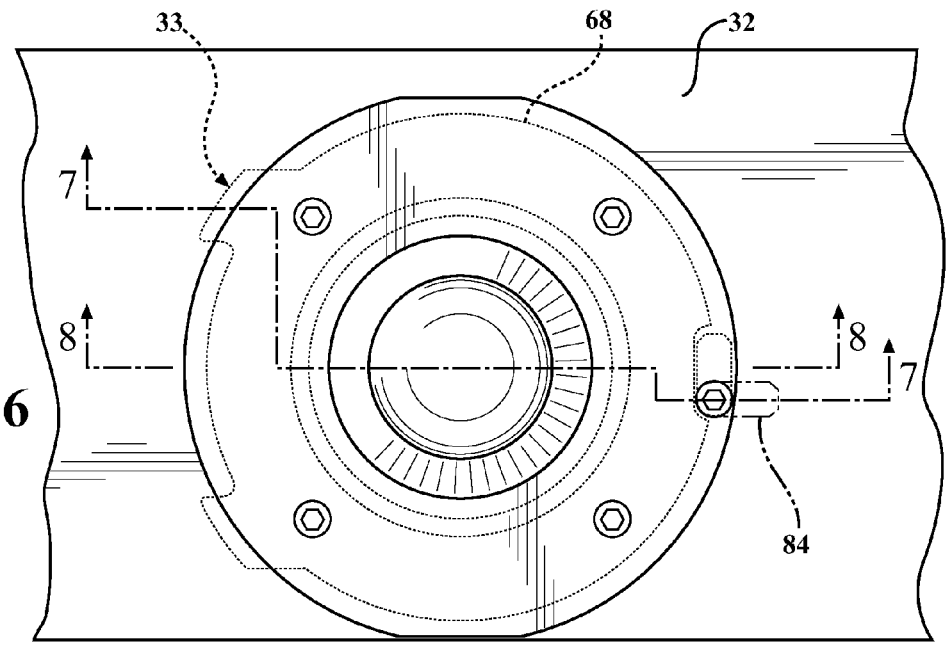
FIG. 6 is a top a plan view of the roller unit.

To provide a generally smooth transition between an outside surface 56 of the retainer cover 48 of the ball transfer unit 33 and an outside surface 58 of the roller tray 32, the lip 50 may be displaced downward from the top wall 34 of the roller tray 32 by an offset 54 (see for example FIG. 5). The offset 54 may generally correspond to a thickness "T" (see for example FIG. 5) of the retainer cover 48 to enable the outside surface 56 of the ball transfer unit 33 align approximately flush with the outside surface 58 of the roller tray 32.

The lip 50 may include one or more lip cutouts 64 to provide clearance for locking features on the ball transfer unit 33 used for connecting the ball transfer unit 33 to the roller tray 32. The locking features are discussed in more detail subsequently.

With reference to FIGS. 7-11, each ball transfer unit 33 includes a bearing housing 66 having an upper lip or housing annulus 68. The housing annulus 68 may be sized to have an outer circumferential diameter 71 less than the inner diameter 62 of the lip 50 of roller tray 32. The bearing housing 68 is preferably seamlessly machined of stainless steel, rather than cast, inasmuch as the machining process may impart substantially higher strength and resiliency to the housing, in comparison to cast housings. The bearing housing 66 may include a bearing cup 70 having a semi-spherical interior 72. The bearing cup 70 includes a wall 74 having an outer surface 76 and an opposing inner surface 78 defining the interior region 72 of the bearing cup 70. The housing annulus 68 extends generally radially outward from the wall 74 of the bearing cup 70.

The housing annulus 70 is provided with a pair of retaining tabs 80 spaced approximately 80° apart around the housing annulus 70. The retaining tabs 80 engage the cutouts 64 in the lip 50 of the roller tray 32 when the ball transfer unit 33 is attached to the roller tray 32. Diametrically opposed from a midpoint of the housing annulus 68 between the two retaining tabs 80 is a cutout 82 that is dimensioned and configured to accommodate passage of a clamp 84 (see FIGS. 6, 7, 9 and 10) used to secure the ball transfer unit 33 to the roller tray 32. A drain hole 86 may be provided at a bottom 88 of the bearing cup 70 to facilitate drainage of fluids.

Figure 7:
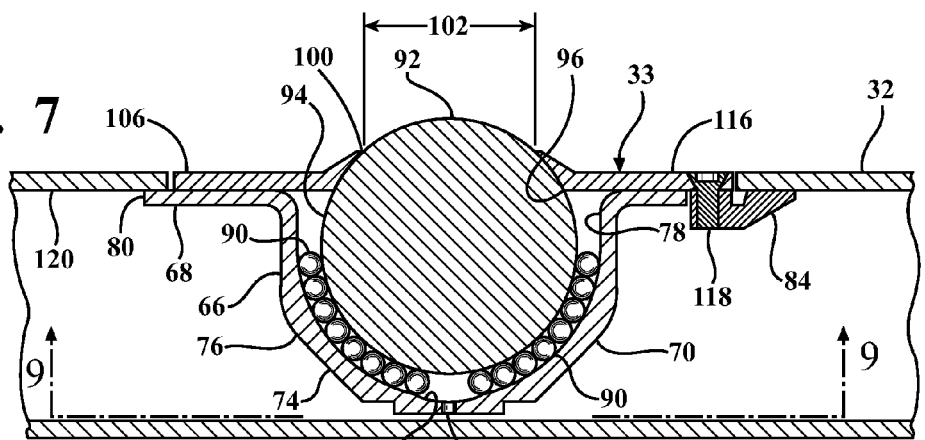
FIG. 7 is partial cross-sectional view of the roller unit taken along section line 7-7 of FIG. 6.
Figure 8:
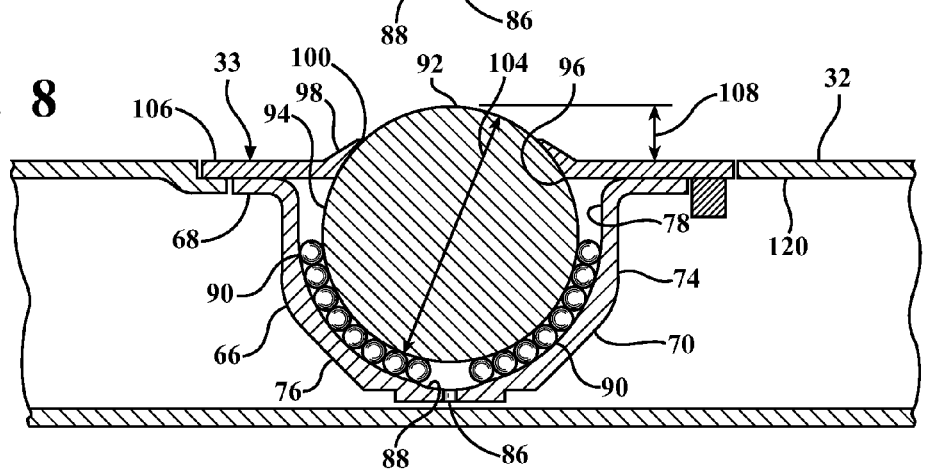
FIG. 8 is partial cross-sectional view of the roller unit taken along section line 8-8 of FIG. 6.

With particular reference to FIGS. 5, 7 and 8, the bearing housing 66 is provided with a plurality of small roller balls 90 and a single large roller ball 92. The small roller balls 90 are arranged within the bearing cup interior 72 along the inner surface 78 of the bearing cup 70. The large roller ball 92 is also positioned within the bearing cup interior 72 and is supported by the small roller balls 90. The large roller ball 92 disperses the small roller balls 90 along the bottom and side walls of the bearing cup 70. The small roller balls 90 form a movable generally low friction layer between the inner surface 78 of the bearing cup 70 and an exterior 94 of the large roller ball 92. This configuration helps to evenly transmit forces associated with the weight of the cargo 30 (see FIG. 1) positioned on the large roller ball 92 to the small roller balls 90 and to the bearing housing 66.

With reference to FIGS. 5-8, the retainer cover 48 may be formed as a one-piece unitary annular machined component that attaches to the housing annulus 68 of the bearing housing 66. The diameter 46 of retainer cover 48 is larger than a diameter 71 of housing annulus 68 and inner diameter 62 of lip 50. The retainer cover 48 includes a center opening 96 through which the large roller ball 92 extends. A tapered lip 98 extends generally upward and inward from the center opening 96 to form a generally cone-shaped configuration. The tapered lip 98 surrounds and guides the large roller ball 92 into a generally centralized relationship with a central axis of the bearing housing 66. The tapered lip 98 terminates at a distal circumferential edge defining a circular opening 100 having a diameter 102 smaller than a diameter 104 of the large roller ball 92. The tapered lip 98 may extend above a surface 106 of the retainer cover 48 a distance of at least one-half of the segment 108 of the large roller ball extending above the surface 106. The height and generally cone-shaped configuration of the tapered lip 98 of the retainer cover 48 helps prevent ingress of water and contaminants from entering the interior 72 of the bearing housing 66.

With particular reference to FIGS. 10-11, the retainer cover 48 may be secured to the bearing housing annulus 68 using threaded fasteners 110. The housing annulus 68 may be provided with a plurality of tapped and threaded holes 112 for engagement the fasteners 110. A plurality of corresponding counter-sunk fastener holes 114 may be provided in the retainer cover 48 that align with the tapped holes 112 in the housing annulus 68 of the bearing housing 66. In this fashion, when the retainer cover 48 is secured to the bearing housing 66, the large roller ball 92 is generally centered in the bearing housing 66, and a portion of the larger roller ball 92 protrudes through the circular opening 100 in the tapered lip 98.

Referring to FIGS. 7 and 10, retainer cover 48 may be provided with the pivoting clamp 84 for releasably attaching the ball transfer unit 33 to the roller tray 32. The clamp 84 may be pivotally secured to an outer rim 116 of the retainer cover 48 using a threaded fastener 118. The clamp 84 may be selectively moved between an unlatched position and a latched position. For example, the clamp unlatched position is illustrated in phantom in the FIGS. 9-10, and the latched position is illustrated in solid line.

With reference to FIGS. 6-9, the ball transfer unit 33 may be attached to the roller tray 32 by inserting the retaining tabs 80 of the housing annulus 68 through the lip cutout 64 in the roller tray 32 and sliding the retaining tabs 80 under the top wall 34 of the roller tray 32. With the clamp 84 rotated to an unlatched position (illustrated in phantom in FIG. 9) generally tangential to an outer circumference of the retainer cover 48, the retainer cover 48 may be positioned within the tray opening 42, thereby permitting the entire ball transfer unit 33 to come to rest on the tray opening lip 50. With the ball transfer unit 33 positioned within the tray opening 42 the retaining tabs 80 on the bearing housing 66 engage an underside 120 of the top wall 34 of the roller tray 32, and the retainer cover 48 rests on the lip 50 of the tray opening 42.

The clamp 84 may be pivotally secured to the retainer cover 48 using the threaded fastener 118. The clamp 84 may be positioned in the unlatched position so as to clear the tray opening 42, and engages the underside surface 120 of the top wall 34 when rotated 90° from the unlatched position to the latched position and secured with the threaded fastener 118. The ball transfer unit 33 may be secured to the roller tray 32 by rotating the clamp 84 approximately 90° from unlatched position to bring the clamp 84 into engagement with the underside surface 120 of the roller tray top wall 34, thereby preventing removal of the ball transfer unit 33 from the roller tray cavity 40. By this operation, the ball transfer unit 33 will be removably secured within the tray opening 42.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A ball transfer unit comprising:
 a bearing housing having a bearing cup and a housing annulus extending radially outward from the bearing cup;
 a first roller ball disposed within an interior of the bearing cup;
 a retainer cover attached to the housing annulus and retains the first roller ball within the interior of the bearing cup, the retainer cover including a first opening through which the first roller ball extends and a tapered lip encircling the first opening and extending upward from an upper surface of the retainer cover and away from the bearing cup, the tapered lip overlaying a portion of the first roller ball.

2. The ball transfer unit of claim 1, wherein an exterior of the tapered lip includes a cone-shaped configuration.

3. The ball transfer unit of claim 1, wherein a distal circumferential edge of the tapered lip defines a second opening through which the first roller ball extends, a diameter of the second opening being less than a diameter of the first opening.

4. The ball transfer unit of claim 3, wherein the first ball extends above a surface of the retainer cover by a first distance and above the circumferential edge of the second opening by a second distance, wherein the second distance is at least one half or greater than the first distance.

5. The ball transfer unit of claim 1 further comprising at least one second roller ball disposed in the bearing cup between the first roller ball and the bearing cup.

6. The ball transfer unit of claim 5, wherein a diameter of the at least one second roller ball is smaller than a diameter of the first roller ball.

7. A ball transfer unit comprising:
 a bearing housing having a bearing cup and a housing annulus extending radially outward from the bearing cup;
 a first roller ball disposed within an interior of the bearing cup;
 a one-piece unitary retainer cover overlaying the housing annulus and including a first opening through which the first roller ball extends, an outer circumferential edge of the retainer cover having a diameter greater than a diameter of an outer circumferential edge of the housing annulus, and an inner circumferential edge of the retainer cover having a diameter less than a diameter of the first roller ball, wherein the retainer cover retains the first roller ball within the interior of the bearing cup.

8. The ball transfer unit of claim 7, wherein the one-piece unitary retainer cover extends radially outward from the circumferential edge of the housing annulus.

9. The ball transfer unit of claim 8, wherein the one-piece unitary retainer cover includes a tapered lip encircling the first opening and extending upward from a surface of the retainer cover and away from the bearing cup, the tapered lip overlaying a portion of the first roller ball.

10. The ball transfer unit of claim 7, wherein the bearing housing includes at least one retaining tab extending radially outward from the housing annulus.

11. The ball transfer unit of claim 10, wherein at least a portion of the at least one retaining tab extends beyond the outer circumferential edge of the one-piece unitary retainer cover.

12. The ball transfer unit of claim 7 further comprising at least one second roller ball disposed in the bearing cup between the first roller ball and the bearing cup.

13. The ball transfer unit of claim 12, wherein a diameter of the at least one second roller ball is smaller than a diameter of the first roller ball.

14. The ball transfer unit of claim 7, wherein the one-piece unitary retainer cover is removably attached to the bearing housing.

15. A roller unit comprising:
 a tubular roller tray including at least one tray opening and an offset lip extending radially inward from a circumferential edge of the tray opening;
 a ball transfer unit releasably attached to the roller tray, the ball transfer unit including a bearing housing having a bearing cup and a housing annulus extending radially outward from the bearing cup;
 a first roller ball disposed within an interior of the bearing cup;
 a one-piece unitary retainer cover overlaying the housing annulus and including a first opening through which the first roller ball extends, the one-piece unitary retainer cover engaging the offset lip of the roller tray and having an inner circumferential diameter less than a diameter of the first roller ball and an outer circumferential diameter greater than a diameter of an outer circumferential edge of the housing annulus.

16. The roller unit of claim 15, wherein the bearing housing includes at least one retaining tab extending radially outward from the housing annulus and engaging the roller tray.

17. The roller unit of claim 16, wherein at least a portion of the at least one retaining tab extends beyond the outer circumferential edge of the one-piece unitary retainer cover.

18. The roller unit of 17, wherein at least a portion of the at least one retaining tab engages the retainer cover.

19. The roller unit of claim further 16 further comprising a latch pivotally attached to the retainer cover and engagable with the roller tray, the latch selectively movable between a latched position, in which the latch is disengaged from the roller tray, and a latched position, in which the latch engages the roller tray.

20. The roller unit of claim 19, wherein the latch is aligned tangential to a circumference of the housing annulus when in the unlatched position, and extends radially outward from the housing annulus when in the latched position.

21. The roller unit of claim 20, wherein the latch and the at least one retaining tab are disposed on diametrically opposite sides of the bearing housing.

\* \* \* \* \*